Sept. 18, 1956  P. MANCINO  2,763,169
MECHANISM FOR ROCKING VEHICULAR WHEEL
Filed Aug. 4, 1953
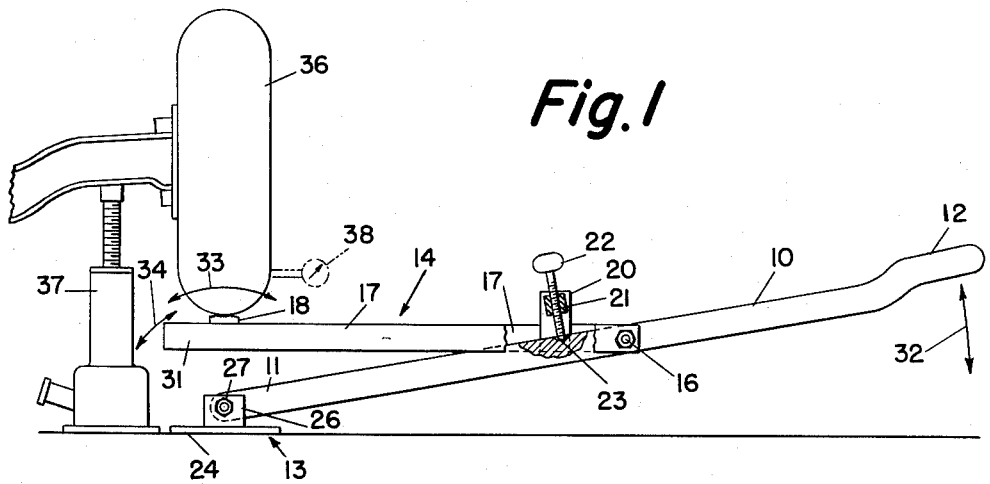
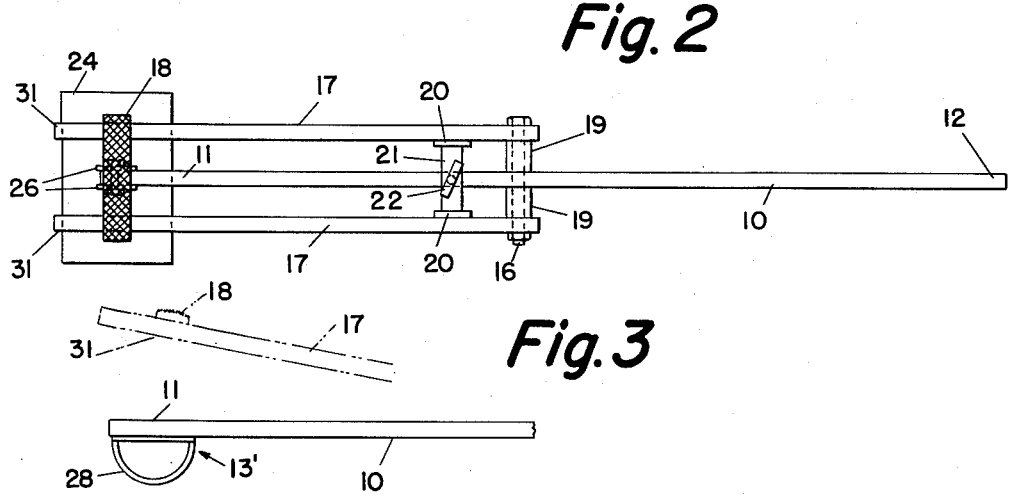
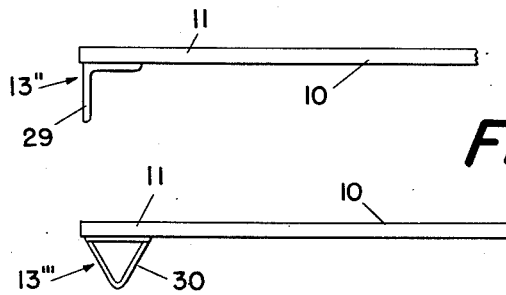
INVENTOR.
PETER MANCINO
BY John D. Myers
ATTORNEY

2,763,169
MECHANISM FOR ROCKING VEHICULAR WHEEL

Peter Mancino, Philadelphia, Pa.

Application August 4, 1953, Serial No. 372,376

10 Claims. (Cl. 81—3)

This invention relates generally to mechanism for producing limited oscillatory motion in a hinged or pivoted member, and is more particularly directed to a rocking lever for producing such motion in vehicle wheels within the limits of play in the wheel mounting.

When measuring front-wheel play in an automobile wheel, it has been customary for the inspector or mechanic to grasp the tire at a point on its circumference, or at diametrically opposed points, and manually rock the wheel within the limits of play in its mounting. This technique, however, has not been entirely satisfactory, for if the rocking force is not applied perpendicularly to the plane of the tire on its vertical diameter, some steering effect of the wheel is likely to result which may introduce an error in the determination of wheel-play.

A further disadvantage inherent in manually rocking an automobile wheel for determination of play is that automobile tires are often quite considerably soiled with mud, grease or other refuse of the road, making them disagreeable to handle and therefore requiring them to be cleaned preliminarily to making the inspection for wheel-play.

It is therefore an object of the invention to provide a simple and efficient device for imparting limited oscillatory movement to a mounted vehicle wheel within the limits of play in the wheel mounting.

Another object of the invention is to provide a device for effecting lateral oscillatory motion of a mounted vehicle wheel due to play, which motion does not include any appreciable steering motion.

A further object of the invention is to provide a vehicle wheel rocking device adapted automatically to apply its force at a point on the vertical diameter of the wheel, and perpendicularly to the plane of the wheel.

Various other objects, features and advantages of the invention will appear from the description given below taken in connection with the accompanying drawing forming a part of the specification and illustrating by way of example a preferred embodiment of the invention, and in which:

Fig. 1 is a side elevation view of my improved rocker mechanism in operative relation with a vehicle wheel, for imparting lateral oscillatory motion to the latter during measurement of wheel-play.

Fig. 2 is a plan view of the rocker mechanism.

Figs. 3, 4 and 5 are side elevation views illustrating modified forms of base members which may be used in association with the rocker mechanism.

Referring to the drawing, the rocker mechanism of the invention in the form illustrated comprises a main lever 10 having a fulcrum end 11 and a handle end 12, the fulcrum end being connected to a base member indicated generally at 13. A second lever, shown generally at 14, is pivoted at one end to the main lever 10 intermediate the ends of the latter by means of a bolt 16 or other pivotal member, and in the form illustrated the second lever comprises a pair of parallel arms 17 joined adjacent their distal ends by means of a cross bar 18. Spacer sleeves or collars 19 surrounding the pivot 16 maintain the arms 17 equally spaced from the main lever 10.

The lever 14 normally extends toward the fulcrum end of the lever 10 and terminates adjacent the said fulcrum end when the lever 14 is substantially parallel to the portion of the lever 10 between its fulcrum end and the pivot 16. For reasons which will appear more fully hereinafter, a minor proportion of the length of lever 14 preferably extends beyond the fulcrum end of the lever 10 when the levers are substantially parallel.

Ears or lugs 20 are secured, as by welding, to the arms 17 adjacent their pivotal attachment to the lever 10, and a block 21 is pivotally mounted between the ears 20, the block 21 having a tapped bore therethrough accommodating a thumbscrew 22. The lower end of the thumbscrew 22 is rounded off and is adapted to repose in a socket 23 formed in the upper surface of the lever 10 between the pivot 16 and the fulcrum for the lever 10 later to be described. It will be apparent by inspection of Fig. 1 that the angular distance between the levers 10 and 14 may be adjusted through a limited arc by actuation of the thumbscrew 22.

In the preferred form illustrated in Figs. 1 and 2, the base member 13 comprises a base plate 24 having a pair of spaced upstanding ears 26 between which the fulcrum end of the lever 10 is pivoted, as at 27. Although I prefer to construct the base member 13 in the form just described, inasmuch as the pivot 27 provides an efficient and convenient fulcrum for the lever 10, it will be understood that the base member may take other forms, three of which are illustrated as 13', 13" and 13''', respectively, in Figs. 3, 4 and 5. In Fig. 3 the base member 13' comprises a semicylindrical element 28, the lever 10 being attached thereto in general alignment with a major chord of the arcuate bottom. In Fig. 4 the base member 13" is in the form of an angle member 29, and in Fig. 5 the base member 13''' consists of a generally triangular prismatic body 30; in both the latter constructions the lever 10 is attached to a face of the base member as shown. In the forms shown in Figs. 3, 4 and 5, the base members are fixed, as by welding, to the fulcrum end 11 of the lever 10, the base members in each case providing a fulcrum for the lever 10 at their line of contact with a subjacent supporting surface (e. g., a garage floor), the said line of contact being perpendicular to the lever 10 and in a plane perpendicular to the plane of movement of that lever.

It will be understood that, for proper operation of the tool of the present invention, the pivotal connection of the lever 14 to the lever 10 should be such as to permit the former to move independently in the same plane in which the lever 10 is adapted to turn about its fulcrum.

As will appear more fully hereinafter, the upper surface of the lever 14 is, in the normal operation of the apparatus, adapted to contact the bottom of a vehicle wheel or other work-piece to which limited oscillatory movement is to be imparted, and, accordingly, the lever 14 is preferably provided adjacent its distal end with a contact portion capable of affording a good positive frictional contact with the work-piece. In the form illustrated the contact portion comprises the cross bar 18 the upper surface of which is serrated or otherwise roughened as shown to enhance its frictional quality. It will be understood that the contact portion may take other forms than that illustrated, and, in fact, may simply comprise an area in the upper surface of the arms 17 if desired, the only limitation being that the contact portion be so located on the lever 14 as to be disposed substantially vertically above the fulcrum provided by the base member when the apparatus is in operative position beneath a work-piece. Therefore, as a general rule, the contact portion and the fulcrum (e. g., pivot 27) provided by the base member will be substantially equidistant from the pivot 16.

It is sometimes desirable to ascertain whether a vehicle wheel mounting permits vertical play, in addition to the lateral play noted above, and to adapt my rocker mechanism for the determination of such vertical play, I may, as previously noted, provide the lever 14 with a minor proportion 31 of its length projecting beyond the contact portion 18 in the direction of the free end of the lever. Inasmuch as the portion 31 of the lever 14 projects beyond the fulcrum provided by the base member it will be given a vertical component when the lever 10 is manipulated in a vertical plane in its normal use, as will appear hereinafter.

The mode of operation of my rocker mechanism will now be described with particular reference to Figs. 1 and 2, from which description the operation of the modifications shown in Figs. 3, 4 and 5 will also be clear.

It will be seen by inspection of Fig. 1 that when the handle end of the lever 10 is moved in a vertical plane, as indicated by the double arrow 32, all points of levers 10 and 14 will rotate about pivot 27 as the center. Consequently, if such movement of the lever 10 is commenced when the contact portion 18 is vertically above the pivot 27, the said contact portion will move laterally along the top of an arc exemplified by the double arrow 33, while the free end of the lever 14, which extends beyond the contact portion 18 by a distance equal to the length of the minor portion 31, will move through an arc having a decided vertical component as represented by the double arrow 34.

When it is desired to examine a vehicle wheel, such as 36, for looseness or play in its mounting, the wheel is first raised a short distance off the ground by means of a jack 37. The rocker mechanism of the invention is then placed beneath the wheel with the fulcrum provided by the base member 13 (e. g., pivot 27) directly beneath the center of the tire, and the thumbscrew 22 is rotated to raise the lever 14 until the contact portion 18 is in contact with the bottom of the tire. With the parts in the positions just described, the main lever 10 should preferably be at a small angle, for example, 10° to the horizontal, in order to permit both raising and lowering the lever 10 through a small arc, as shown in Fig. 1. When the lever 10 is then oscillated in a vertical plane, the contact portion 18 oscillates along the top of a circular arc, which movement, in turn, causes the wheel to oscillate laterally. Inasmuch as lateral wheel-play, even in objectionable amount as defined by the various state statutes, is measured only in small fractions of an inch near the outside diameter of the wheel, the movement of the contact portion 18 between the limits of play may be considered to be a straight horizontal line, the contact portion 18 not rotating sufficiently about the pivot 27 to become separated from the bottom of the tire on the wheel 36. An accurate measurement of the amount of such lateral oscillation of the wheel may be made by placing a suitable gauge, such as a dial indicator 38, in contact with the tire near one of the extremities of its vertical diameter.

If it is desired to test the wheel for play in a vertical direction, it is necessary only to place the base member 13 in a position to bring the portion 31 of the lever 14 in contact with the bottom of the tire, whereupon vertical movement of the lever 10, as before, will impart a generally vertical movement to the portion 31 which, in turn, will move the wheel 36 vertically through a distance permitted by the limits of vertical play of the wheel mounting.

While the invention has been described with respect to certain examples which give satisfactory results, it will be understood by those skilled in the art that various changes and modifications may be made without departing from the spirit and scope of the invention, and it is therefore intended in the appended claims to cover all such changes and modifications.

What I desire to claim is:

1. A rocker mechanism for imparting limited oscillatory movement to a work-piece, comprising a lever having a fulcrum end and a handle end, a second lever pivoted at one end to said first mentioned lever, the free end of said second lever normally extending toward said fulcrum end and terminating adjacent thereto when said second lever is substantially parallel to the portion of said first mentioned lever between said fulcrum end and said pivoted connection, and means operatively interposed between said levers and acting on said first mentioned lever between said fulcrum end and said pivoted connection for adjusting through a limited arc the angular distance between said levers.

2. A rocker mechanism for imparting limited oscillatory movement to a work-piece, comprising a base member, main lever attached at one end to said base member, said base member providing a fulcrum for said main lever, a second lever pivoted at one end to said main lever for movement in substantially the same plane in which said main lever is adapted to turn about said fulcrum, the free end of said second lever normally extending toward said base member and terminating adjacent said fulcrum when said second lever is substantially parallel to the portion of said main lever between said fulcrum and said pivoted connection, and means operatively interposed between said levers and acting on said main lever between said fulcrum and said pivoted connection for adjusting through a limited arc the angular distance between said levers.

3. Apparatus according to claim 2 wherein said second lever includes a contact portion adjacent said free end for frictionally contacting said work-piece, said contact portion and said fulcrum being substantially equidistant from said pivoted connection.

4. Apparatus according to claim 3 wherein a minor proportion of the length of said second lever projects beyond said contact portion in the direction of said free end.

5. Apparatus according to claim 2 wherein said base member is provided with an arcuate bottom portion for rocking contact with a subjacent supporting surface, and wherein said main lever is fixed to said base member in general alignment with a major chord of said arcuate bottom.

6. Apparatus according to claim 2 wherein said base member provides substantially a line of contact with a subjacent supporting surface, said line of contact being perpendicular to said main lever and in a plane perpendicular to the plane of movement of said lever.

7. A rocker mechanism for imparting limited oscillatory movement to a work-piece comprising a base member, a main lever attached at one end by means of a pivot to said base member for movement in a vertical plane, a second lever attached at one end by means of a second pivot to said main lever intermediate the ends of the latter for movement in substantially the same vertical plane, the free end of said second lever normally extending toward said base member and terminating adjacent said first mentioned pivot when said second lever is substantially parallel to the portion of said main lever between said pivots, and means including a screw operatively interposed between said levers and acting on said main lever between said pivots for adjusting through a limited arc the angular distance between said levers.

8. Apparatus according to claim 7 wherein said second lever includes a contact portion adjacent said free end for frictionally contacting said work-piece, said contact portion and said first mentioned pivot being substantially equidistant from said second pivot.

9. Apparatus according to claim 8 wherein a minor proportion of the length of said second lever projects beyond said contact portion in the direction of said free end.

10. A rocker mechanism for imparting limited oscillatory movement to a work-piece, comprising a base member, a main lever attached at one end to said base member, said base member providing a fulcrum for said main lever, a second lever pivoted at one end to said main lever intermediate the ends of the latter for movement in substantially the same plane in which said main lever is adapted to turn about said fulcrum, the free end of said second lever normally extending toward said base member and terminating adjacent said fulcrum when said second lever is substantially parallel to the portion of said main lever between said fulcrum and said pivoted connection, a nut member carried by one of said levers, and a screw in said nut, one end of said screw bearing against the other of said levers at a point closer to said pivoted connection than the latter is from said fulcrum, whereby the angular distance between said levers may be adjusted through a limited arc by rotation of said screw in said nut.

References Cited in the file of this patent

UNITED STATES PATENTS

| | | |
|---|---|---|
| 677,920 | Babbitt | July 9, 1901 |
| 1,445,845 | O'Laughlin | Feb. 20, 1923 |
| 1,511,463 | Griffith | Oct. 14, 1924 |
| 1,726,157 | Marek | Aug. 27, 1929 |
| 2,272,114 | Haist | Feb. 3, 1942 |
| 2,569,242 | Kors | Sept. 25, 1951 |